(12) United States Patent
Lace et al.

(10) Patent No.: US 6,362,728 B1
(45) Date of Patent: Mar. 26, 2002

(54) ANTI-THEFT VEHICLE SYSTEM

(75) Inventors: Jeffrey J. Lace, Huntington Beach; Jack Durban, Mission Viejo, both of CA (US)

(73) Assignee: Gatekeeper Systems, LLC., Irvine, CA (US)

(*) Notice: Subject to any disclaimer, the term of this patent is extended or adjusted under 35 U.S.C. 154(b) by 0 days.

(21) Appl. No.: 09/355,436

(22) PCT Filed: Feb. 4, 1998

(86) PCT No.: PCT/US98/02043

§ 371 Date: Oct. 25, 1999

§ 102(e) Date: Oct. 25, 1999

(87) PCT Pub. No.: WO98/34819

PCT Pub. Date: Aug. 13, 1998

Related U.S. Application Data (60) Provisional application No. 60/037,699, filed on Feb. 7, 1997.

(51) Int. Cl.⁷ .................................................. B60R 25/10
(52) U.S. Cl. .................. 340/426; 340/568.5; 188/111; 280/33.994
(58) Field of Search .................. 340/426, 539, 340/531, 547, 568.5, 933, 935; 188/111, 5, 162, 19, 4 R, 71.1, 72.1, 72.3; 280/33.994, 33.991; 180/167; 307/10.2, 10.3, 10.4, 10.5, 10.6; 70/226, 228; 455/345

(56) References Cited

U.S. PATENT DOCUMENTS

| | | |
|---|---|---|
| 1,671,774 A | 5/1928 | McIntosh .................... 16/35 R |
| 1,928,750 A | 2/1933 | Apple et al. ................ 188/162 |
| 1,968,584 A | 11/1934 | Apple ........................ 188/162 |
| 2,759,738 A | 8/1956 | Reiter ......................... 280/62 |
| 2,812,041 A | 11/1957 | Mugler ........................ 188/74 |
| 2,964,140 A | 7/1960 | Berezny et al. ............. 188/111 |
| 3,029,905 A | 4/1962 | Nowak ........................ 188/111 |
| 3,031,037 A | 4/1962 | Stollman .................... 188/111 |
| 3,031,038 A | 4/1962 | Chait ......................... 188/111 |
| 3,044,577 A | 7/1962 | Lotz ............................... 188/5 |
| 3,083,398 A | 4/1963 | Swalm ....................... 16/18 R |

(List continued on next page.)

FOREIGN PATENT DOCUMENTS

| | | |
|---|---|---|
| EP | 9215476 | 9/1992 |
| FR | 2053630 | 4/1971 |
| GB | 2137388 | 10/1984 |
| GB | 2266643 | 11/1993 |
| WO | WO 95/13953 | 5/1995 |
| WO | WO 95/20515 | 8/1995 |
| WO | WO 96/21206 | 7/1996 |

* cited by examiner

*Primary Examiner*—Daniel J. Wu
*Assistant Examiner*—Toan Pham
(74) *Attorney, Agent, or Firm*—Bliss McGlynn & Nolan, P.C.

(57) ABSTRACT

An anti-theft vehicle system for a vehicle wheel having a rotational axis including a signal generator to generate a first predetermined signal around a first predetermined perimeter and to generate a second predetermined signal around a second predetermined perimeter at least partially disposed within the first predetermined perimeter, at least one inhibitor disposed within the vehicle wheel to selectively engage and disengage the vehicle wheel to resist and allow rotational movement of the vehicle wheel about the rotational axis, a rotatable structure disposed within the vehicle wheel and cooperating with the at least one inhibitor for moving the at least one inhibitor between an engaged position and a disengaged position with respect to the vehicle wheel, and a receiver disposed within the vehicle wheel to receive a first predetermined signal and second predetermined signal to activate the rotatable structure to move the at least one inhibitor between the engaged position and the disengaged position.

20 Claims, 6 Drawing Sheets

U.S. PATENT DOCUMENTS

| | | | |
|---|---|---|---|
| 3,117,655 A | 1/1964 | Skupas et al. | 188/111 |
| 3,157,871 A | 11/1964 | Umanoff | 340/539 |
| 3,217,839 A | 11/1965 | Watkins et al. | 188/4 R |
| 3,272,527 A | 9/1966 | Martin | 280/33.994 |
| 3,305,064 A | 2/1967 | Mullis et al. | 430/492 |
| 3,356,185 A | 12/1967 | Isaacks | 188/31 |
| 3,366,201 A | 1/1968 | Pesta | 188/110 |
| 3,495,688 A | 2/1970 | Issacks | 188/31 |
| 3,590,962 A | 7/1971 | Parker | 188/111 |
| 3,652,103 A | 3/1972 | Higgs | 280/33.994 |
| 3,717,225 A | 2/1973 | Raushbaum et al. | 188/29 |
| 3,719,370 A | 3/1973 | Gintick et al. | 280/33.994 |
| 3,751,757 A | 8/1973 | Stosberg et al. | 16/35 R |
| 3,804,211 A | 4/1974 | Scherzinger | 188/5 |
| 3,809,191 A | 5/1974 | Woodward | 188/106 A |
| 3,820,623 A | 6/1974 | Akashi et al. | 180/167 |
| 3,892,295 A | 7/1975 | Hahto | 188/111 |
| 4,199,043 A | 4/1980 | Lankester et al. | 188/111 |
| 4,242,668 A | 12/1980 | Herzog | 340/539 |
| 4,338,594 A | 7/1982 | Holm | 340/568.5 |
| 4,424,511 A | 1/1984 | Alberts, Jr. | 73/646 |
| 4,472,706 A | 9/1984 | Hodge et al. | 340/941 |
| 4,503,943 A | 3/1985 | Tsukui | 188/5 |
| 4,524,985 A | 6/1985 | Drake | 280/33.994 |
| 4,577,880 A | 3/1986 | Bianco | 280/33.994 |
| 4,580,800 A | 4/1986 | Upton et al. | 280/33.994 |
| 4,591,175 A | 5/1986 | Upton et al. | 280/33.994 |
| 4,609,075 A | 9/1986 | Snedeker | 188/5 |
| 4,683,461 A | 7/1987 | Torre | 340/551 |
| 4,772,880 A | 9/1988 | Goldstein | 340/568.5 |
| 4,809,824 A | 3/1989 | Fargier et al. | 188/72.8 |
| 4,868,544 A | 9/1989 | Havens | 340/568.5 |
| 4,878,050 A | 10/1989 | Kelley | 340/825 |
| 4,908,604 A | 3/1990 | Jacob | 340/539 |
| 4,987,406 A | 1/1991 | Reid | 340/539 |
| 4,990,890 A | 2/1991 | Newby | 340/539 |
| 5,000,297 A | 3/1991 | Shaw et al. | 188/156 |
| 5,053,768 A | 10/1991 | Dix, Jr. | 340/988 |
| 5,194,844 A | 3/1993 | Zelda | 340/426 |
| 5,283,550 A | 2/1994 | MacIntyre | 340/539 |
| 5,315,290 A | 5/1994 | Moreno et al. | 340/568.5 |
| 5,349,329 A | 9/1994 | Smith | 340/539 |
| 5,357,182 A | 10/1994 | Wolfe et al. | 318/379 |
| 5,394,962 A | 3/1995 | Gray | 188/1.12 |
| 5,402,106 A * | 3/1995 | DiPaolo et al. | 340/572.3 |
| 5,432,412 A | 7/1995 | Harris et al. | 318/3 |
| 5,465,984 A | 11/1995 | Pellegrini, Jr. et al. | 280/11.214 |
| 5,499,697 A | 3/1996 | Trimble et al. | 188/19 |
| 5,576,691 A | 11/1996 | Coakley et al. | 340/568.5 |
| 5,598,144 A | 1/1997 | Lace | 340/568.5 |
| 5,607,030 A | 3/1997 | Swift et al. | 188/1.12 |
| 5,821,856 A | 10/1998 | Lace | 340/568.5 |
| 5,831,530 A | 11/1998 | Lace et al. | 340/568.5 |
| 5,881,846 A | 3/1999 | French et al. | 188/1.12 |
| 6,037,869 A * | 3/2000 | Lace | 340/568.5 |
| 6,054,923 A * | 4/2000 | Prather et al. | 340/568.5 |
| 6,102,414 A * | 8/2000 | Schweninger | 280/33.994 |
| 6,125,972 A * | 10/2000 | French et al. | 188/1.12 |
| 6,127,927 A * | 10/2000 | Durban | 340/568.5 |

ANTI-THEFT VEHICLE SYSTEM

CROSS-REFERENCE TO RELATED APPLICATION(S)

This application claims priority from copending U.S. Provisional Patent Application Serial No.: 60/037,699, filed Feb. 7, 1997.

BACKGROUND OF THE INVENTION

1. Field of the Invention

The present invention relates generally to vehicles and, more particularly, to an anti-theft vehicle system used to inhibit rotation of a vehicle wheel outside a predetermined spatial perimeter to mitigate the theft of vehicles or limit the travel thereof within a specific boundary.

2. Description Of the Related Art

It is sometimes desired to contain a vehicle within a predetermined spatial boundary or perimeter. In particular, retail stores are attempting to reduce the amount of lost vehicles such as shopping carts, which are either stolen or taken out of the normal bounds of the stores and not returned.

Accordingly, U.S. Pat. No. 5,194,844 to Zelda discloses a vehicle theft prevention system which inhibits the use of a shopping cart once it is moved outside a boundary. This patented system includes an electronic wire that extends around and defines a perimeter of normal operating space which is used by operators of a store's shopping carts. The electronic wire produces an electromagnetic field which is sensed by a sensor located adjacent one wheel of the shopping cart. The sensor sends a signal to a motor which moves a brake pad against the wheel of the shopping cart. Two limit switches are used to stop the motor when the motor has either moved the brake pad into or out of engagement with the wheel of the shopping cart.

One disadvantage of the above system is that it is relatively expensive because the motor must be large and two limit switches are needed. Another disadvantage of the above system is that an asymmetric time-variant wave form is used for the electromagnetic field which is undesired.

SUMMARY OF THE INVENTION

It is, therefore, one object of the present invention to provide an anti-theft vehicle system for vehicles.

It is another object of the present invention to provide an anti-theft vehicle system for vehicles such as shopping carts, toys, wheeled inventory, and industrial forklifts.

It is yet another object of the present invention to provide an anti-theft vehicle system for a vehicle wheel to prevent an operator from moving the vehicle outside a predetermined spatial perimeter.

It is still another object of the present invention to provide an anti-theft vehicle system for a shopping cart wheel which is inexpensive and effective at making it difficult for an operator to move the shopping cart out of a predetermined operating area of a retail store.

To achieve the foregoing objects, the present invention is an anti-theft vehicle system for a vehicle wheel having a rotational axis. The anti-theft vehicle system includes a signal generator to generate a first predetermined signal around a first predetermined perimeter and to generate a second predetermined signal around a second predetermined perimeter at least partially disposed within the first predetermined perimeter. The anti-theft vehicle system also includes at least one inhibitor disposed within the vehicle wheel to selectively engage and disengage the vehicle wheel to resist and allow rotational movement of the vehicle wheel about its rotational axis. The anti-theft vehicle system includes a rotatable structure disposed within the vehicle wheel and cooperating with the inhibitor for moving the inhibitor between an engaged position and a disengaged position with the vehicle wheel. The anti-theft vehicle system further includes a receiver disposed within the vehicle wheel to receive the first predetermined signal and the second predetermined signal to activate the rotatable structure to move the at least one inhibitor between the engaged position and the disengaged position.

One advantage of the present invention is that an anti-theft vehicle system is provided for vehicles such as shopping carts, toys, wheeled inventory, and industrial forklifts. Another advantage of the present invention is that the anti-theft vehicle system provides a vehicle wheel which deters an operator from moving the vehicle outside a predetermined spatial perimeter. Yet another advantage of the present invention is that the anti-theft vehicle system provides a cost effective vehicle wheel to deter operators from taking shopping carts out of a retail store's shopping cart boundary by preventing the vehicle wheel from rotating. Still another advantage of the present invention is that the anti-theft vehicle system provides a one-piece brake, springs and component mounting area for the vehicle wheel. A further advantage of the present invention is that the anti-theft vehicle system is self-energizing in both directions. Yet a further advantage of the present invention is that the anti-theft vehicle system provides a linkage overrun for position lock of the vehicle wheel. Still a further advantage of the present invention is that the anti-theft vehicle system changes the angle of a thrust arm to maximize brake linkage efficiency.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 6 is a schematic view of a control circuit of the anti-theft vehicle system of FIGS. 1 through 3.

FIG. 9 is a schematic view of another embodiment, according to the present invention, of the transmitting circuit of FIG. 7.

DESCRIPTION OF THE PREFERRED EMBODIMENT(S)

Figures 1, 2:
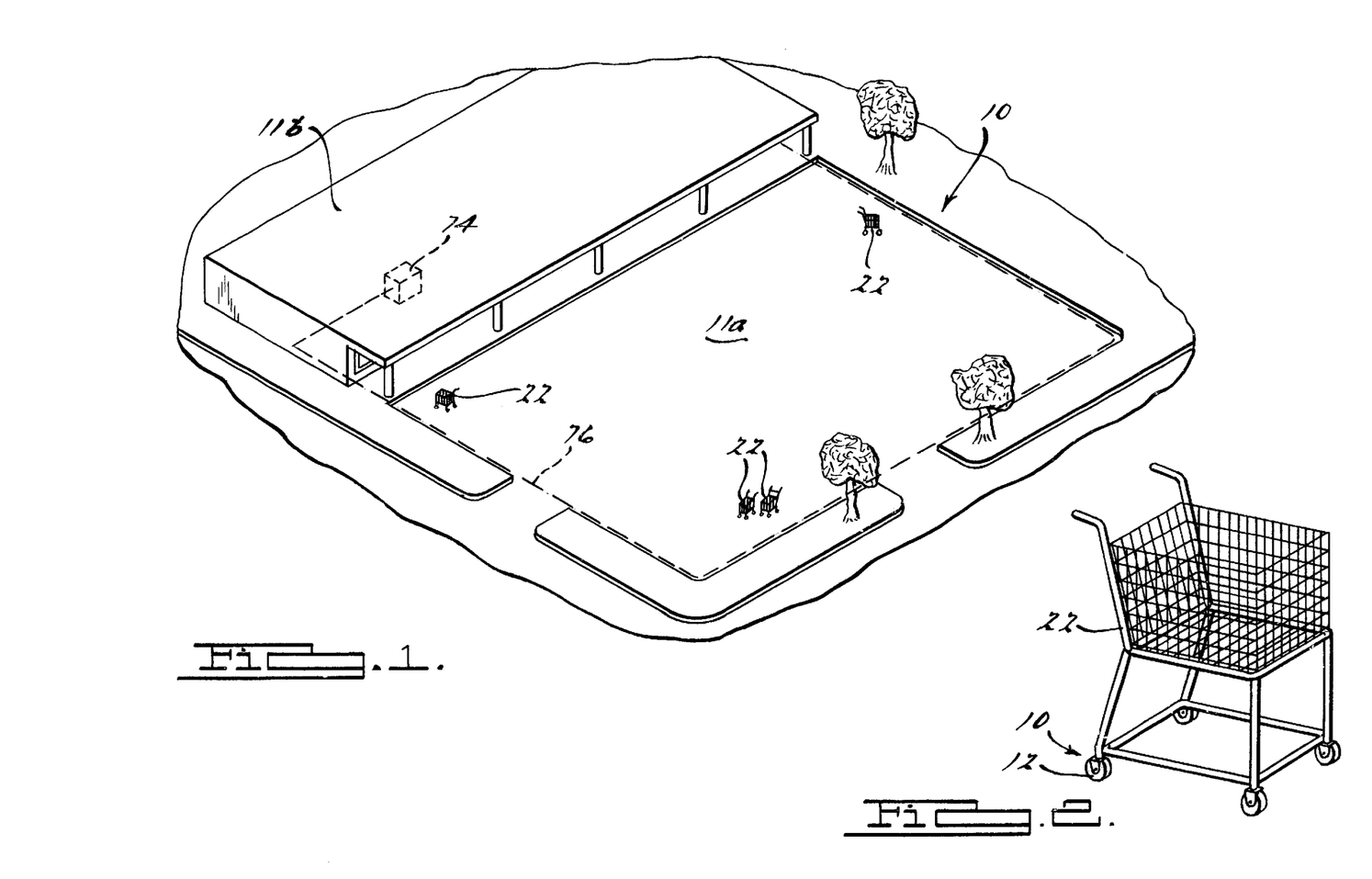
FIG. 1 is a perspective view of a anti-theft vehicle system, according to the present invention, illustrated in operational relationship with vehicles and a predetermined spatial perimeter.
FIG. 2 is a perspective view of a vehicle and the anti-theft vehicle system of FIG. 1.
Figure 3:
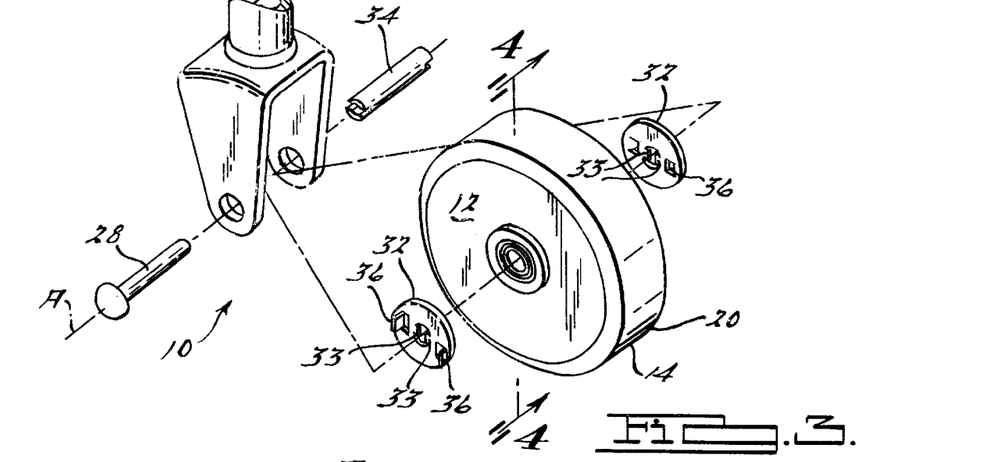
FIG. 3 is an exploded view of a wheel of the vehicle and the anti-theft vehicle system of FIG. 2.
Figure 4:
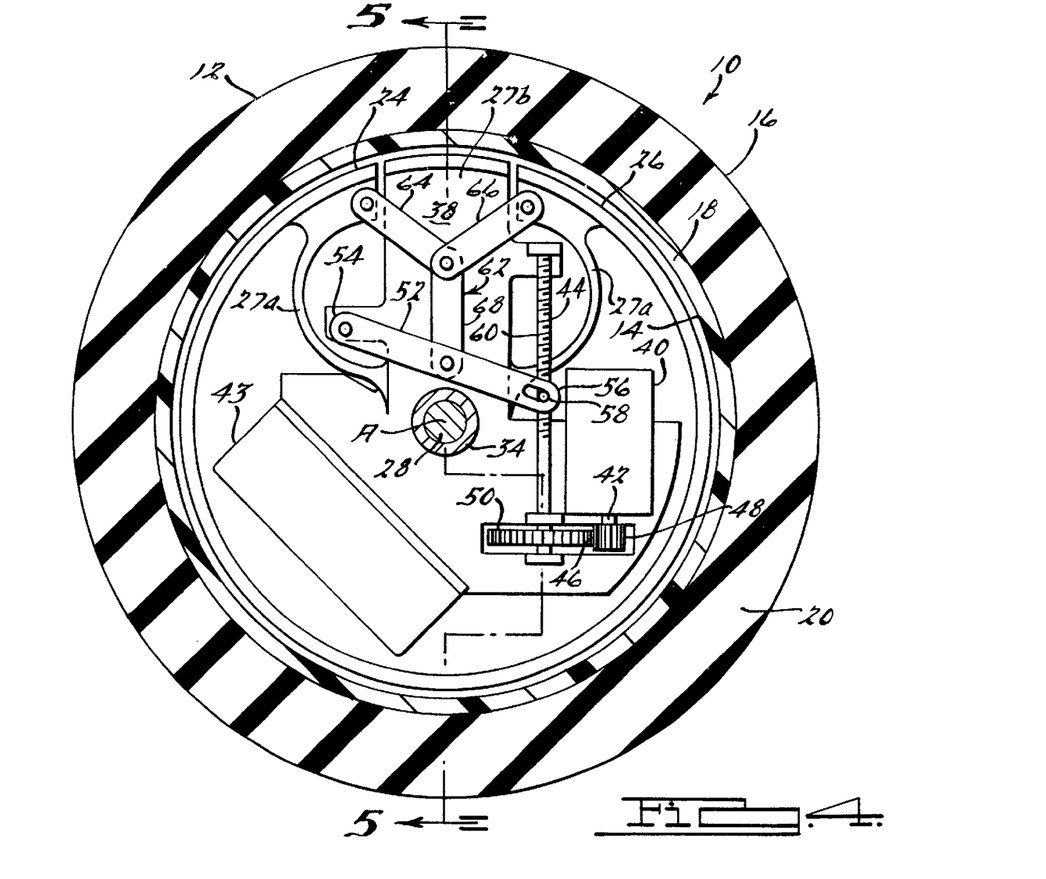
FIG. 4 is a sectional view taken along line 4—4 of FIG. 3.
Figure 5:
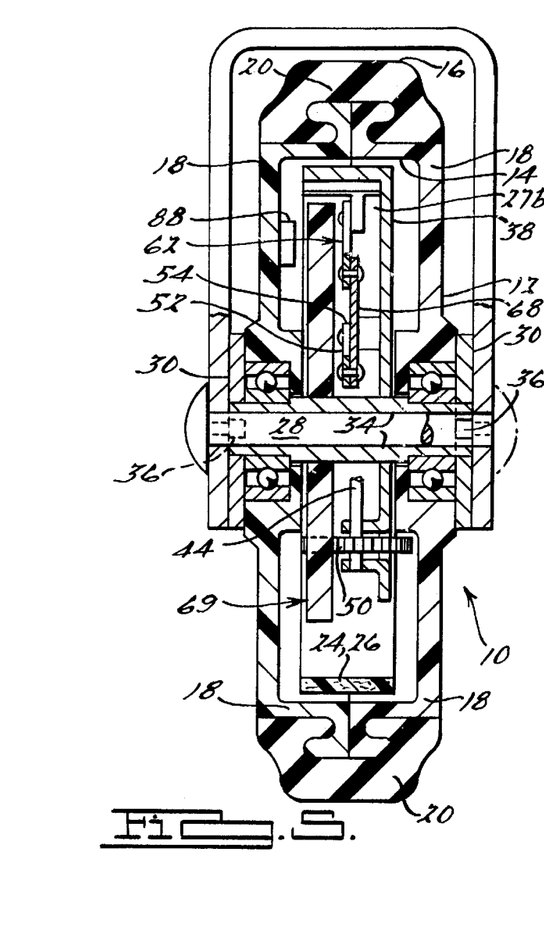
FIG. 5 is a sectional view taken along line 5—5 of FIG. 4.

Referring to FIG. 1, one embodiment of an anti-theft vehicle system 10, according to the present invention, is shown in operational relationship with vehicles inside a predetermined spatial boundary. In one embodiment, the system 10 is used to prevent theft of vehicles such as shopping carts 22 from a predetermined spatial boundary or perimeter 11a of a retail store 11b. It should be appreciated that the system 10 may be used on other vehicles such as toys, wheeled inventory, industrial forklifts to prevent the same from exiting a predetermined spatial boundary.

As illustrated in FIGS. 2 through 5, the system 10 includes at least one wheel 12 for the vehicle embodiment of a shopping cart 22. The wheel 12 has an inner diameter 14 and an outer diameter 16 and a rotational axis A about which the wheel 12 rotates. The wheel 12 also has a housing or hub 18 and a surface engaging member 20. The surface engaging member 20 is made of a suitable material such as a plastic material. Preferably, the plastic material is a urethane material. The hub 18 may be fabricated from the same material as the surface engaging member 20. Preferably, the hub 18 is made of a plastic material such as ABS and secured to the surface engaging member 20.

The system 10 also includes at least one inhibitor 24 disposed within the wheel 12 to selectively engage the wheel 12 and prevent the wheel 12 from rotating about its rotational axis A. The inhibitor 24 is a partial cylindrical shaped brake pad which is forced against the inner diameter 14 or hub 18 of the wheel 12. In one embodiment, a second inhibitor 26 is disposed within the wheel 12 to selectively engage another portion of the hub 18 of the wheel 12. The second inhibitor 26 is also a partial cylindrical shaped brake pad which is forced against the inner diameter 14 of the wheel 12. The inhibitors 24, 26 are integral and made of one-piece. The inhibitors 24, 26 are fabricated from a plastic material, such as a glass reinforced nylon material, which has a memory quality to maintain the shape of the inhibitors 24, 26. The inhibitors 24, 26 have a spring 27a connected to an extension 27b which acts as a component mounting area. The memory quality of the plastic material for the springs 27a creates a spring-like force predisposing the inhibitors 24, 26 to disengage the wheel 12. It should be appreciated that the inhibitors 24, 26, springs 27a and extension 27b are fabricated as one-piece from the same material.

The system 10 further includes an axle pin or shaft 28 which acts as the rotational axis A for the wheel 12. The shaft 28 is made of a metal material such as steel. The system 10 also includes two waterproof bearings 30 and yoke lock plates 32 supported by the shaft 28. The yoke lock plates 32 have internal notches 33 which engage an axle 34 and prevent the axle 34, which rides along the shaft 28, from rotating. The yoke lock plates 32 also include tabs 36 which prevent the waterproof bearings 30 from rotating.

The system 10 includes an axle arm 38 securely mounted such as by welding about the axle 34. The axle arm 38 is a plate made of a metal material such as steel. The extension 27b is connected to the axle arm 38 by suitable means such as an adhesive. The system 10 also includes a motor 40 such as an electric motor mounted to the extension 27b of the inhibitors 24, 26 between the rotational axis A and the inner diameter 14. The motor 40 provides rotational movement independent of the movement of the wheel 12 along an axis defined by a motor shaft 42. The motor 40 receives power from a power source such as a battery 43 which is electrically connected to both the motor 40 and a wheel controller 72 to be described. It should be appreciated that the battery 43 is attached to the extension 27b of the inhibitors 24, 26 by suitable means.

The system 10 further includes a screw or worm gear 44 rotated by the motor 40 through a gear drive 46. The gear drive 46 allows the motor 40 to be placed along side the worm gear 44, conserving space and reducing the rotational speed of the worm gear 44. More specifically, the gear drive 46 includes a first gear 48 and a second gear 50 such that the second gear 50 has a larger diameter than the first gear 48. The first gear 48 is secured to the motor shaft 42 and rotates at a faster rate than the second gear 50 which is driven by the first gear 48. It should be appreciated that the gear drive 46 may use any number of gears and gear sizes depending on the size and motor speed requirements.

The system 10 also includes a drive arm or lever 52 connected to the axle arm 38. The lever 52 has a pivotal end 54 and a gear engaging end 56. The gear engaging end 56 receives the worm gear 44 and moves along the worm gear 44 as the worm gear 44 is rotated. The gear engaging end 56 includes a nut 58 for receiving the worm gear 44 therein and rides along the worm gear 44 as the nut 58 receives the threads 60 of the worm gear 44.

The lever 52 pivots about a pivot end 54 which is pivotally secured to the axle arm 38. When the lever 52 pivots about the pivot end 54, the inhibitors 24, 26 and the wheel 12 engage to prevent the rotational movement of the wheel 12. If, however, the inhibitors 24, 26 are already engaging the wheel 12, the motor 40 will reverse to pivot the lever 52 back toward the motor 40 to disengage the inhibitors 24, 26 from the wheel 12, allowing the wheel 12 to rotate along with the other wheels of the shopping cart 22.

The system 10 also includes a linkage, generally indicated at 62, to connect the inhibitors 24, 26 to the lever 52. The linkage 62 is connected to the lever 52 between the pivotal end 54 and the gear engaging end 56. The linkage 62 includes a first thrust arm or link 64 and a second thrust arm or link 66 which are pivotally moveable with respect to each other. The first and second links 64 and 66 are pivotally secured to each of the first and second inhibitors, 24 and 26, respectively.

The linkage 62 further includes a transfer arm or principle link 68 which is pivotally secured to the first and second links 64 and 66 and the lever 52. The movement allowed by the principle link 68 forces the first and second links 64 and 66 to move in opposite directions. When the two links 64, 66 move in opposite directions, the first and second inhibitors 24, 26 move in opposite directions, either into engagement or disengagement with the hub 18 of the wheel 12. Although not necessary, the first and second links 64 and 66 are identical in shape and move not only in opposite directions but with equal magnitude. Further, the cost of the system 10 is further reduced by having the first, second and principle links 64, 66 and 68 fabricated to the same shape and size. This reduces the cost of the system 10 further by reducing parts.

Referring to FIG. 6, the anti-theft vehicle system 10 includes a receiver or control circuit, generally shown at 69, for the system 10. The control circuit 69 is a circuit board overlay which is disposed within the hub 18 of the wheel 12. The control circuit 69 receives a predetermined perimeter signal to activate the motor 40 to move the inhibitors 24, 26 such that the inhibitors 24, 26 either engage or disengage the wheel 12. Preferably, the control circuit 69 includes an antenna 70 which receives the predetermined perimeter signal such as an RF signal created by a signal generator 74 to be described.

The control circuit 69 also includes a wheel controller 72 which receives the predetermined perimeter signal from the antenna 70 and is electrically connected between the antenna 70 and the motor 40. The wheel controller 72 selectively activates the motor 40 based on the coded predetermined perimeter signal received from the antenna 70. The predetermined perimeter signal is created by a signal generator 74 and buried wire cable 76 to be described and illustrated in FIG. 1.

The wheel controller 72 includes a tuned receiver 78 which receives the predetermined perimeter signal from the antenna 70. The wheel controller 72 also includes a tone decoder 80 which receives the predetermined perimeter signal from the tuned receiver 78. The tuned receiver 78 amplifies the predetermined perimeter signal and sends it to the tone decoder 80 for decoding. The wheel controller 72 also includes a flip flop retrieval deactivation circuit 82 and a motor controller timer 84. The flip flop retrieval deactivation circuit 82 receives the predetermined perimeter signal once it has been decoded and determines which direction the motor 40 is to rotate the motor shaft 42. The flip flop retrieval deactivation circuit 82 signals the motor controller timer 84 to operate the motor 40 dependent upon the signal received by the flip flop retrieval deactivation circuit 82 and the tone decoder 80. The wheel controller 72 includes a master timer 86 which receives input from a rotation sensor 88 such as a magnet.

For example, the shopping cart 22 passes over the buried wire cable 76 to signify that the shopping cart 22 has passed either into or out of the predetermined spatial perimeter 11a defined by the buried wire cable 76. The flip flop retrieval deactivation circuit 82 receives the predetermined perimeter signal from the tuned receiver 78 stating the location of the shopping cart 22 has changed. The flip flop retrieval deactivation circuit 82 then determines whether the shopping cart 22 was inside or outside the buried wire cable 76 by determining whether the wheel 12 was rotating. From the rotation sensor 88, determination of the rotation of the wheel 12 will determine whether the shopping cart 22 was inside or outside of the buried wire cable 76. If the rotation sensor 88 produces no signal, the wheel 12 is not rotating and is already locked. Therefore, receiving a signal from the tuned receiver 78 will indicate that the shopping cart 22 has passed back over the predetermined spatial perimeter 11a and into the allowed area for the shopping cart 22 to operate. The rotational state of the wheel 12 goes from a non-rotating state to a rotating state. If, however, the flip flop retrieval deactivation circuit 82 receives a signal from the tuned receiver 78 when the rotation sensor 88 is sending a signal indicating that the wheel 12 is rotating, it will be determined that the shopping cart 22 has moved to a location outside of the predetermined spatial perimeter defined by the buried wire cable 76. As a result, the motor 40 will be activated such that the inhibitors 24, 26 will abut the wheel hub 18 preventing the wheel 12 from rotating. Thus, the rotational state of the wheel 12 has gone from a rotating state to a non-rotating state.

The signal generator 74, shown in FIG. 1, generates a square wave output having a low frequency cycle between 60 Hz and 1 kHz which is sent along the buried wire cable 76 and defines the predetermined spatial perimeter 11a. As a result, the shopping cart 22 may operate inside the area defined by the predetermined spatial perimeter 11a. It should be appreciated that the signal generator 74 may be any type of signal generator suitable to produce a signal which will pass along the entire length of the buried wire cable 76.

Figure 7:
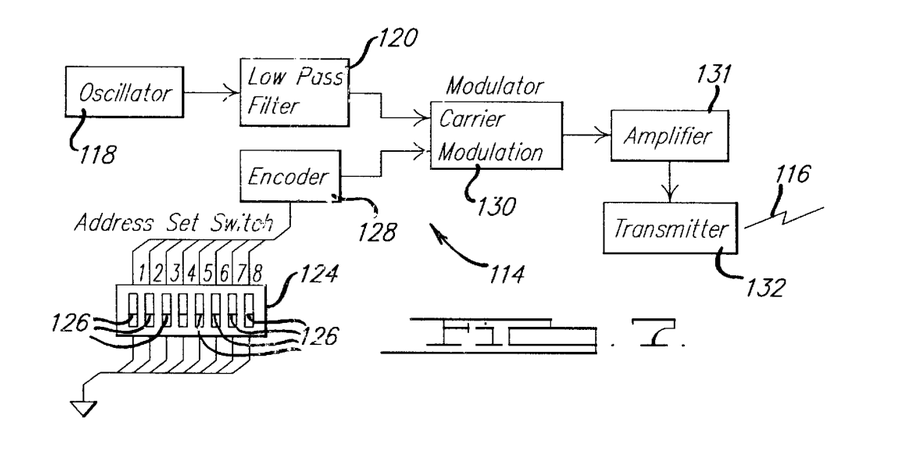
FIG. 7 is a schematic view of a transmitting circuit, according to the present invention, of the anti-theft vehicle system of FIGS. 1 through 3.

Referring to FIG. 7, one embodiment of a transmitting circuit 114, according to the present invention, is shown for the anti-theft vehicle system 10. The transmitting circuit 114 generates a predetermined perimeter signal of magnetic flux, graphically represented by line 116, defining the predetermined spatial perimeter 11a of an area such as a parking lot of a retail store 11b. The transmitting circuit 114 includes an oscillator 118 for creating a carrier signal defining a carrier frequency at a fundamental frequency less than nine kilohertz (9.0 kHz). Preferably, the carrier signal is defined by a square wave. It should be appreciated that the square wave at a carrier frequency less than nine kilohertz (9.0 kHz) may have harmonics which are greater than nine kilohertz (9.0 kHz).

The transmitting circuit 114 also includes a low pass filter 120 which receives the carrier frequency created by the oscillator 118. The low pass filter 120 eliminates all carrier harmonics other than the fundamental harmonic created by the signal defined by the carrier frequency which results in a sine wave. In another embodiment, the low pass filter 120 may be designed to allow the carrier harmonics other than the fundamental harmonic to pass therethrough and be received by a receiving circuit 122 to be described. It should be appreciated that the low pass filter 120, which allows lower carrier harmonics to pass therethrough, permits a control circuit 122 to be described to couple and decode the lower carrier frequencies at one of the harmonics of the fundamental carrier harmonic. As a result, smaller electronic componentry can be used which allows for a more inexpensive receiving circuit 122 occupying less space.

The transmitting circuit 114 includes an address set switch 124 to identify the transmitting circuit 114. The address set switch 124 couples the transmitting circuit 114 with each control circuit 122 to be described which may be utilized by the anti-theft vehicle system 10. The address set switch 124 includes, in one embodiment, eight individual switches 126 which are preset by the operator of the anti-theft vehicle system 10 to insure the proper operation thereof. The transmitting circuit 114 also includes an encoder 128 which receives the output of the address set switch 124. The encoder 128 is a digital encoder that establishes the address and engage (or disengage) command to be transmitted by the signal.

The transmitting circuit 114 further includes a modulator 130 and amplifier 131 which receives the output of the low pass filter 120 and the encoder 128. The modulator 130 allows the digital encoder 128 to modulate the signal received by the low pass filter 120. The amplifier 131 amplifies the signal received by the modulator 130. The transmitting circuit 114 also includes a low impedance transmitter 132. The transmitter 132 transmits the predetermined perimeter signal 116. In one embodiment, the amplifier 131 is the transmitter which is also the antenna. In one embodiment, the transmitter 132 is a closed circuit or antenna of conducting material which surrounds an area such as the parking lot and defines the predetermined spatial perimeter 11a for the shopping carts 22 to be contained within. It should be appreciated that the amplifier 131 must be able to provide enough current to drive the low impedance transmitter 132.

Referring to FIG. 9, another embodiment of the transmitting circuit 114 is shown. Like primed numerals represent similar elements to that of the transmitting circuit 114 shown in FIG. 7. The transmitting circuit 114' includes a remotely transportable or hand-held transmitter 132' for transmitting the predetermined perimeter signal having the same carrier frequency discussed above. The transmitting circuit 114' includes remote switches 134 and 136 to either lock or unlock the inhibitor 24 within the wheel 12 depending on the location of the shopping cart 22. By way of example, if the shopping cart 22 is located out beyond the predetermined spatial perimeter 11a, the anti-theft vehicle system 10 will have locked the wheel 12 preventing the rotation thereof. The remotely transportable transmitter 132' can be transported to the shopping cart 22 to unlock the wheel 12 so that the shopping cart 22 may be pushed back within the predetermined spatial perimeter 11a.

Figure 8:
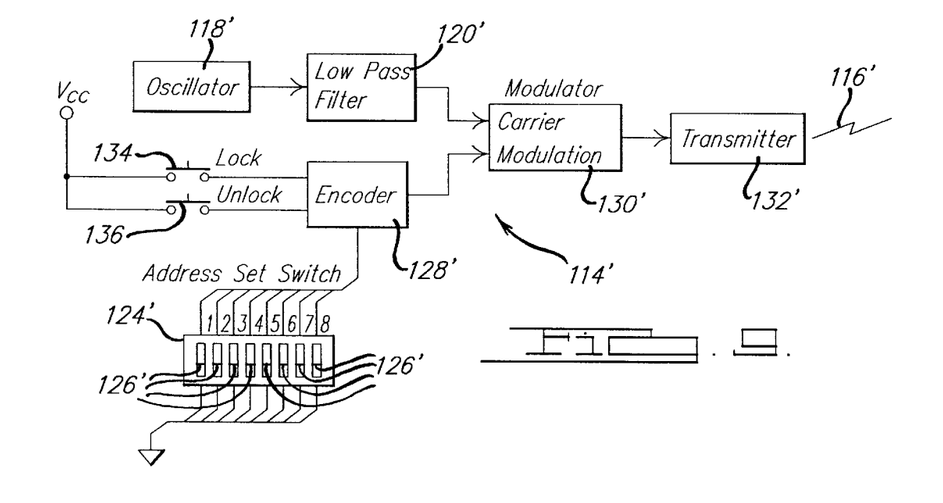
FIG. 8 is a schematic view of another embodiment of a control circuit, according to the present invention, of the anti-theft vehicle system of FIGS. 1 through 3.

Referring to FIG. 8, another embodiment 122, according to the present invention, of the control circuit 69 is shown and receives the predetermined perimeter signal 116. The control circuit 122 is a near field resonant receiver that detects and eventually decodes a pulse modulated magnetic field. Upon receiving the predetermined perimeter signal 116, the control circuit 122 sends a signal to activate the motor 40 to move the inhibitor 24 to engage or disengage the wheel 12. It should be appreciated that the control circuit 122 is disposed within the hub 18 of the wheel 12.

The control circuit 122 includes a resonant tank circuit 138 which eliminates reception by the control circuit 122 of all frequencies other than the frequency of the predetermined perimeter signal 116. The resonant tank circuit 138 is tuned to the specific harmonic, fundamental or otherwise, transmitted by the transmitting circuit 114. The resonant tank circuit 138 allows for the detection of the predetermined perimeter signal 116 without having to provide any radio frequency (RF) gain. The resonant tank circuit 138 includes a capacitor and an inductor (neither shown) connected in parallel. It should be appreciated other elements may be used to favor the predetermined perimeter signal frequencies to be received. It should also be appreciated that the shopping cart 22 is used as an antenna to receive the predetermined perimeter signal 116 transmitted by the transmitting circuit 114,114' and prevent electromagnetically isolating the wheel 12 to bypass the anti-theft vehicle system 10.

The control circuit 122 also includes a gain stage circuit 140 electrically connected to the resonant tank circuit 138 and amplifies the predetermined perimeter signal 116 after the predetermined perimeter signal 116 has been received by the resonant tank circuit 138. The gain stage circuit 140 may be a simplified circuit because it is only receiving one harmonic of an oscillating signal due to the tuning of the resonant tank circuit 138. The gain stage circuit 140 amplifies the predetermined perimeter signal 116 by a predetermined amount such as nineteen decibels (19 db). The gain stage circuit 140 is configured as a linear mode amplifier that draws a predetermined current such as five microamps (5.0 μA).

The control circuit 122 further includes a detector 142 which is electrically connected to the gain stage circuit 140. The detector 142 receives the predetermined perimeter signal 116 without the unwanted harmonics which are not received due to the specific tuning of the resonant tank circuit 138.

The control circuit 122 includes a post detection amplifier 143 for post detection gain. The post detection amplifier 143 is direct current (DC) coupled to the detector 142 to provide a ground source to an inverted input of a final gain stage to be described. This DC ground path causes the gain stage circuit 140 to invert the ground or zero potential signal to a maximum positive voltage signal. The positive voltage signal is then DC coupled to the post detection amplifier 143 which, in turn, inverts it again, back to a zero potential, prior to sending it to a decoder 148 to be described.

The control circuit 122 also includes an address set switch 144 similar to that of the transmitting circuit 114. The address set switch 144 includes a plurality of individual switches 146 which are set to a specific code or combination to match the individual switches 126 of the transmitting circuit 114.

The control circuit 122 includes a decoder 148 which is maintained in a standby mode when the potential signal is zero. When the potential signal is high, the decoder 148 matches the predetermined perimeter signal 116 from the post detection amplifier with that of the predetermined perimeter signal 116 created by the address set switch 144 to determine whether the signal is from the transmitting circuit 114. In one embodiment, the decoder 148 checks the predetermined perimeter signal 116 three times. If the decoder 148 determines that it has received a valid signal from the transmitting circuit 114, the decoder 148 then determines whether the wheel 12 is to be locked or unlocked.

The control circuit 122 includes a latch 157 to reset the decoder 148 to prevent redundant lock and unlock actuations. The latch 157 receives a signal from the decoder 148. The latch 157 is a flip flop which will allow a lock signal to pass to a lock drive timer 150 only if the immediately preceding signal was not a lock signal. This prevents redundant lock signals unnecessarily reducing the battery potential. Likewise, the latch 157 will prevent an unlock signal from passing to an unlock drive 158 if it was immediately preceded by an unlock signal. The latch 157 prevents signals resulting from the resonant tank circuit 138 being physically close to the antenna 76. The latch 157 includes three CMOS transistors (none shown).

The anti-theft vehicle system 10 further includes a stall detecting circuit 158 which detects when the motor 40 stops the rotational movement. The stall detect circuit 158 will override the signal sent by the decoder 148 and prematurely terminate the rotation of the motor 40 by the lock drive 152 or the unlock drive 156. The stall detecting circuit 158 determines when the inhibitor 24 is in its fully retracted position or its fully extended position against the wheel 12.

Figure 10:
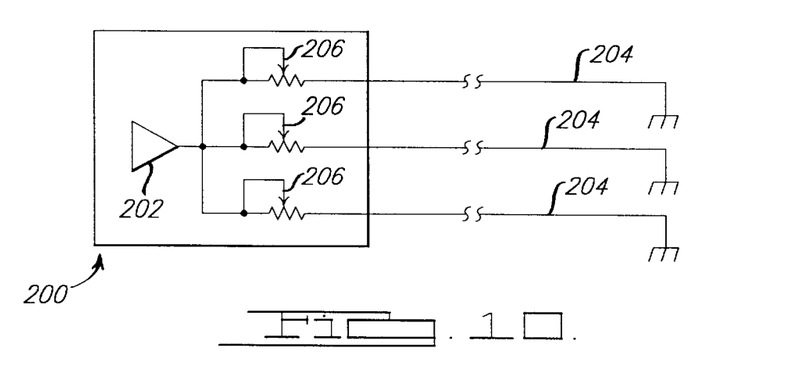
FIG. 10 is a block view of yet another embodiment, according to the present invention, of a transmitter of the anti-theft vehicle system of FIGS. 1 through 3.

Referring to FIG. 10, the transmitter is generally indicated at 200. The transmitter 200 is shown having an amplifier 202. The output of the amplifier 202 is sent along a plurality of antenna branches 204. These antenna branches 204 may be configured in a manner suitable for the space about which the antenna branches 204 need to surround. The level of signal output is controlled by a potentiometer 206.

Figure 11:
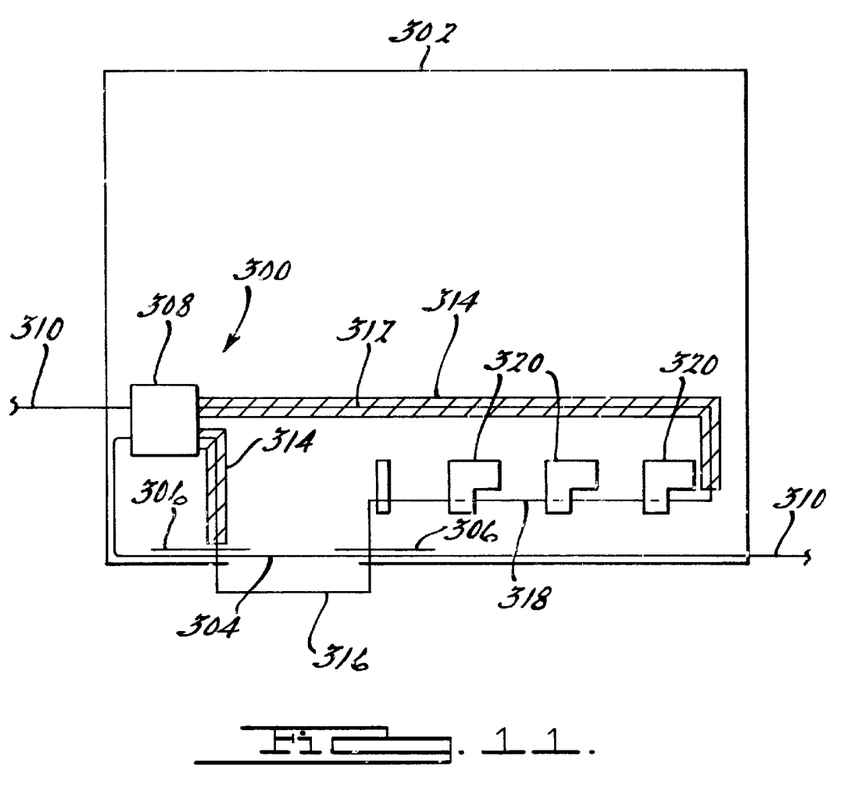
FIG. 11 is a plan view of still another embodiment, according to the present invention, of the anti-theft vehicle system of FIGS. 1 through 3.

Referring to FIG. 11, another embodiment, according to the present invention, of the anti-theft vehicle system 10 is generally indicated at 300. The present invention is preferably partially housed within a retail store 302. The retail store 302 includes at least one opening or doorway 304 having doors 306 opening and closing the doorway 304. It should be appreciated by those skilled in the art that the retail store 302 may have additional doorways similar to the doorway 304.

The anti-theft vehicle system 300 includes a signal generator 308 which generates a signal, as disclosed above, through a buried wire cable 310 or the like. The buried wire cable 310 extends around a predetermined perimeter (not shown). As with the embodiments discussed above, the wheel 12 of the shopping cart 22 will lock up once it passes over the buried wire cable 310.

In this embodiment, the signal generator 308 generates a second signal, namely an exit disarm signal. The exit disarm signal is transmitted through an exit disarm cable 312. The exit disarm cable 312 is partially insulated by a shielding material 314 as is known in the art so as not to affect the anti-theft vehicle system 300 at those points. Other portions of the exit disarm cable 312 are not shielded. A portion 316 of the exit disarm cable 312 extends out of the retail store 302 adjacent to the doorway 304. Another portion 318 of the exit disarm cable 312 extends across retail store check-out counters 320. The exit disarm signal 312 momentarily disarms the wheel 12 of the shopping cart 22. This allows the shopping cart 22 to pass through the doorway 304 and over the buried wire cable 310 which carries the signal to activate the wheel 12.

By routing the buried wire cable 310 across the doorway 304, theft of merchandise by exiting the doorway 304 with a cart full of merchandise is prevented because the anti-theft vehicle system 300 will prevent the shopping cart 22 from passing through the doorway 304 by locking the wheel 12. The only way, therefore, that the shopping cart 22 may exit the retail store 302 is by passing over the second portion 318 of the exit disarm cable 312 by passing through a check-out counter 320 and paying for the merchandise. It should be appreciated that in lieu of a floor or exit threshold disarm loop, the disarm signal may be manually delivered from a remotely transportable transmitter, previously described, to disarm the wheel 12 of the shopping cart 22 to allow the shopping cart 22 to exit the retail store 302.

The first portion 316 of the exit disarm cable 312 extends out from the retail store 302 adjacent the doorway 304. The first portion 316 of the exit disarm cable 312 prevents the anti-theft vehicle system 300 from locking up the wheel 12 of the shopping cart 22 as the shopping cart 22 re-enters the retail store 302 through the doorway 304. More specifically, the shopping carts 22 may enter the retail store 302 freely and are inhibited from exiting the retail store 302 through the doorway 304 unless they pass by a check-out counter 320 and over the exit disarm cable 312. It should be appreciated that, if the shopping cart 22 enters the retail store 302, it will pass over the exit disarm cable 312 prior to the buried wire cable 310.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An anti-theft vehicle system for a vehicle wheel having a rotational axis comprising:
    a signal generator to generate a first predetermined signal around a first predetermined perimeter and to generate a second predetermined signal around a second predetermined perimeter at least partially disposed within the first predetermined perimeter;
    at least one inhibitor disposed within the vehicle wheel to selectively engage and disengage the vehicle wheel to resist and allow rotational movement of the vehicle wheel about the rotational axis;
    a rotatable structure disposed within the vehicle wheel and cooperating with said at least one inhibitor for moving said at least one inhibitor between an engaged position and a disengaged position with respect to the vehicle wheel; and
    a receiver disposed within the vehicle wheel to receive the first predetermined signal and second predetermined signal to activate said rotatable structure to move said at least one inhibitor between said engaged position and said disengaged position.

2. An anti-theft vehicle system as set forth in claim 1 including a first buried wire cable for transmitting the first predetermined signal.

3. An anti-theft vehicle system as set forth in claim 2 including a second buried wire cable for transmitting the second predetermined signal.

4. An anti-theft vehicle system as set forth in claim 3 including a shielding material for insulating a portion of said second buried wire cable from said first buried wire cable.

5. An anti-theft vehicle system as set forth in claim 3 wherein said signal generator includes an amplifier and a potentiometer for controlling the level of signal output by said amplifier.

6. An anti-theft vehicle system as set forth in claim 5 wherein said first buried wire cable includes a plurality of branches connected to said amplifier.

7. An anti-theft vehicle system for a vehicle wheel having a rotational axis comprising:
    at least one inhibitor disposed within the vehicle wheel to selectively engage and disengage the vehicle wheel to resist and allow rotational movement of the vehicle wheel about the rotational axis;
    rotatable means disposed within the vehicle wheel and cooperating with said at least one inhibitor for moving said at least one inhibitor between an engaged position and a disengaged position with respect to the vehicle wheel;
    a transmitting circuit for generating a first predetermined signal defining a first predetermined spatial perimeter and for generating a second predetermined signal defining a second predetermined spatial perimeter at least partially disposed within the first predetermined spatial perimeter; and
    a receiving circuit disposed within the vehicle wheel for receiving the first predetermined signal and second predetermined signal to activate said rotatable means to move said at least one inhibitor between said engaged position and said disengaged position when the vehicle wheel passes the predetermined spatial perimeter.

8. An anti-theft vehicle system as set forth in claim 7 wherein said transmitting circuit includes an oscillator to create at least one carrier frequency.

9. An anti-theft vehicle system as set forth in claim 8 wherein said oscillator creates the at least one carrier frequency at a frequency less than nine kilohertz.

10. An anti-theft vehicle system as set forth in claim 7 wherein said transmitting circuit includes at least one antenna of electrically conductive material to transmit the first predetermined signal along and define the first predetermined spatial perimeter.

11. An anti-theft vehicle system as set forth in claim 7 wherein said transmitting circuit includes a remotely transportable transmitter for transmitting the second predetermined signal to move said at least one inhibitor between said engaged position and disengaged position.

12. An anti-theft vehicle system a set forth in claim 7 wherein said transmitting circuit includes a low pass filter to eliminate carrier harmonics of the predetermined signal.

13. An anti-theft vehicle system as set forth in claim 7 wherein said transmitting circuit includes an amplifier and a potentiometer for controlling the level of signal output by said amplifier.

14. An anti-theft vehicle system for a vehicle comprising:
- a transmitter to generate a predetermined signal around a predetermined spatial perimeter;
- a plurality of antennas connected to said transmitter to transmit the predetermined signal along and define the predetermined spatial perimeter;
- at least one vehicle wheel;
- at least one inhibitor disposed within the at least one vehicle wheel to selectively engage and disengage the at least one vehicle wheel to resist and allow rotational movement of the at least one vehicle wheel;
- a rotatable structure disposed within the at least one vehicle wheel and cooperating with said at least one inhibitor for moving said at least one inhibitor between an engaged position and a disengaged position with respect to the at least one vehicle wheel; and
- a receiving circuit disposed within the at least one vehicle wheel to receive the predetermined signal to activate said rotatable structure to move said at least one inhibitor between said engaged position and said disengaged position.

15. An anti-theft vehicle system as set forth in claim 14 wherein said receiving circuit includes a resonant tank circuit to eliminate reception by said receiving circuit of all frequencies other than frequencies of the predetermined signal.

16. An anti-theft vehicle system as set forth in claim 15 wherein said receiving circuit includes a detector electrically connected to said resonant tank circuit to receive the predetermined signal.

17. An anti-theft vehicle system as set forth in claim 16 wherein said receiving circuit includes a gain stage circuit electrically connected to said detector to amplify the predetermined signal after the predetermined signal has been received and detected.

18. An anti-theft vehicle system as set forth in claim 14 wherein said transmitter includes an amplifier.

19. An anti-theft vehicle system as set forth in claim 14 wherein said transmitter includes a remotely transportable transmitter for transmitting the signal to move said at least one inhibitor between said engaged position and disengaged position.

20. An anti-theft vehicle system as set forth in claim 14 including a low pass filter to eliminate carrier harmonics of the predetermined signal.

* * * * *

UNITED STATES PATENT AND TRADEMARK OFFICE
CERTIFICATE OF CORRECTION

PATENT NO. : 6,362,728 B1
DATED : March 26, 2002
INVENTOR(S) : Jeffrey J. Lace and Jack Durban It is certified that error appears in the above-identified patent and that said Letters Patent is hereby corrected as shown below:

<u>Title page,</u>
Item [56], References Cited, U.S PATENT DOCUMENTS,
"1,928,750 A    2/1933" should read -- 1,928,750 A    10/1933 --.
"1,968,584 A    11/1934" should read -- 1,968,584 A    7/1934 --.
"2,964,140 A    7/1960" should read -- 2,964,140 A    12/1960 --.
Reference is missing: -- 6,161,849 A   12/2000 Schweninger ............... 280/33,994 --.

Signed and Sealed this

Nineteenth Day of November, 2002

Attest:

Attesting Officer

JAMES E. ROGAN
*Director of the United States Patent and Trademark Office*